Oct. 2, 1928.  
J. H. MOFFAT  
VEHICLE PARKING DEVICE  
Filed Nov. 12, 1927  
1,686,460  
2 Sheets-Sheet 2
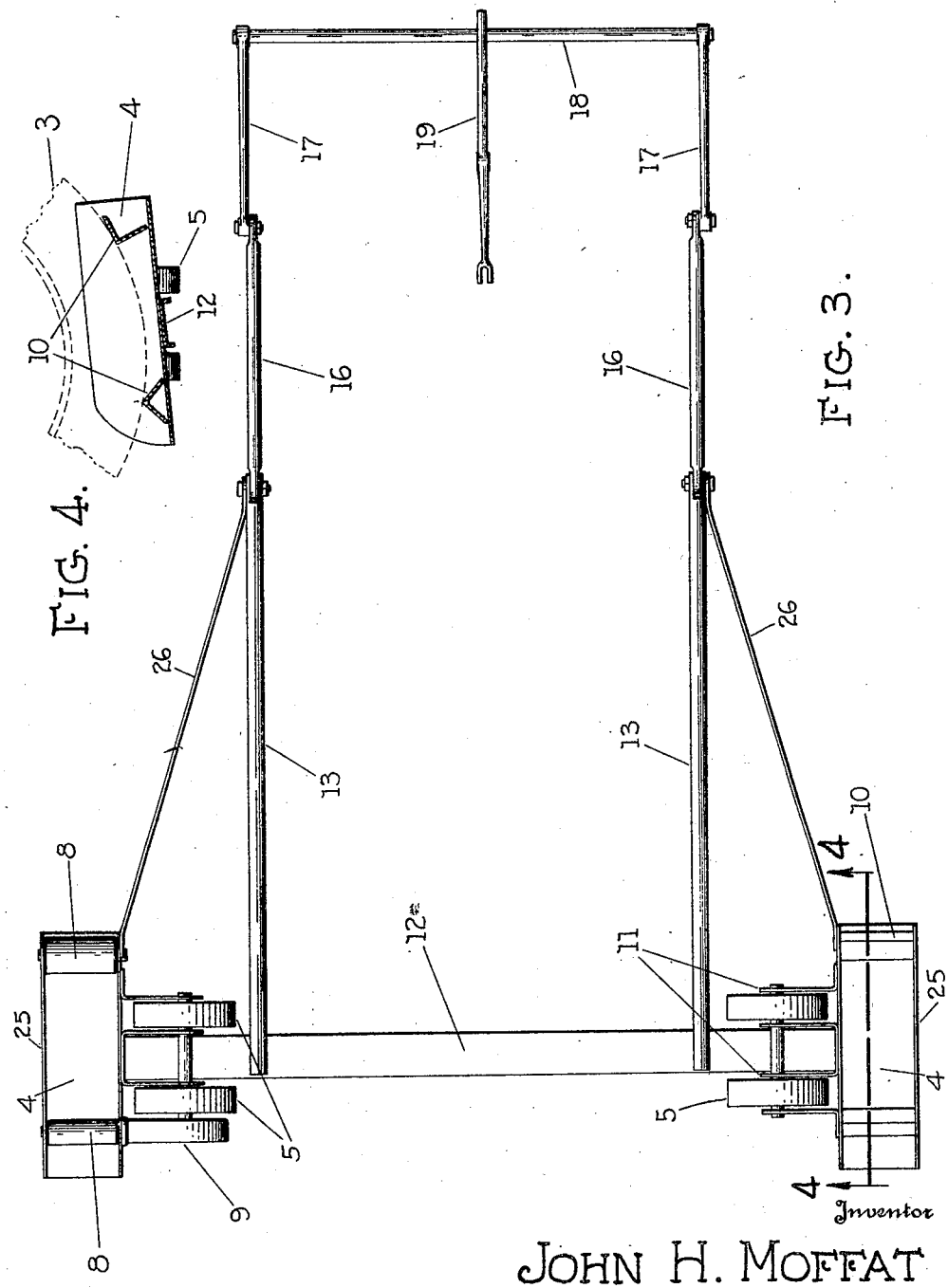
Inventor  
JOHN H. MOFFAT  
By Owen H. Spencer  
Attorney Patented Oct. 2, 1928.

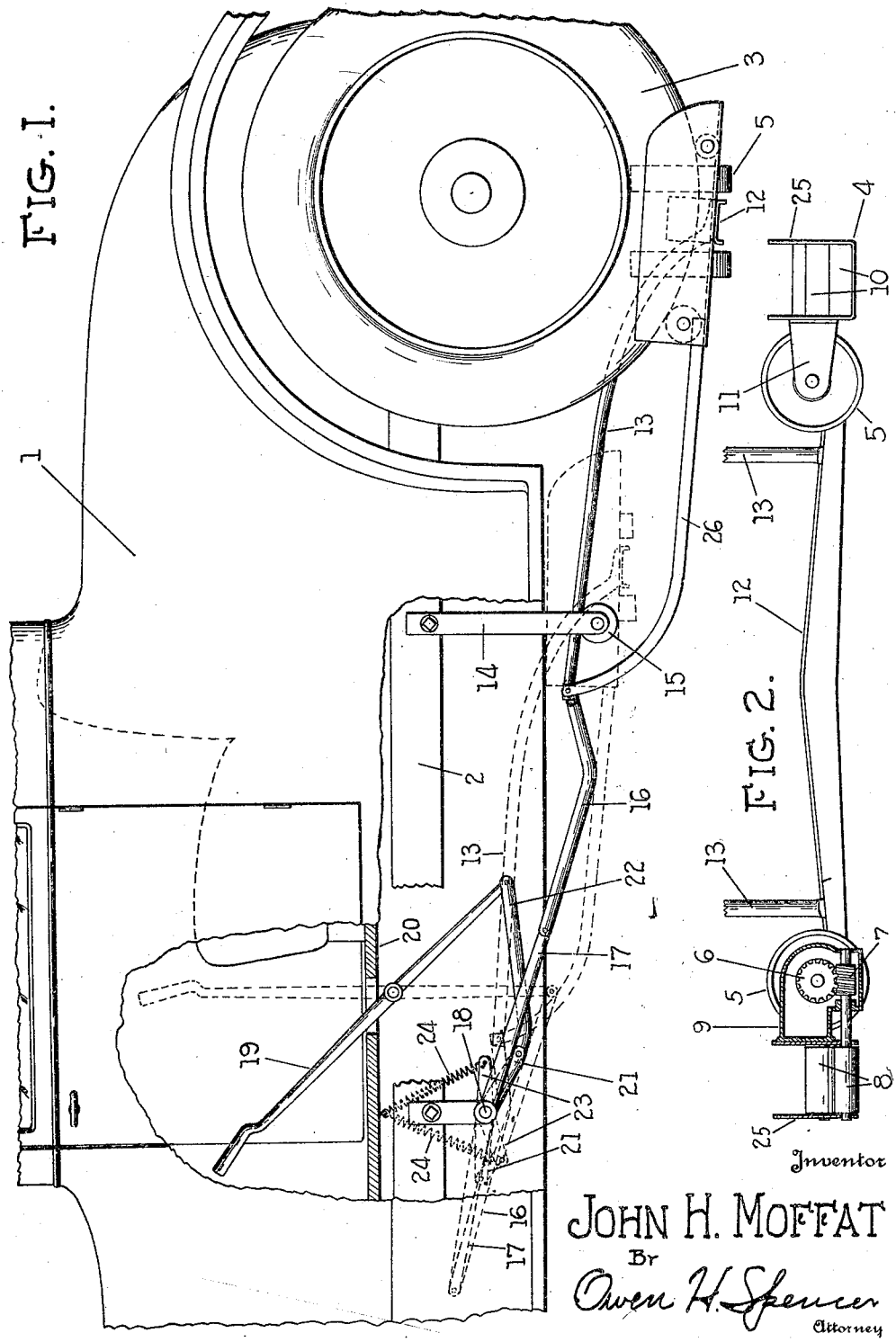

1,686,460

UNITED STATES PATENT OFFICE.

JOHN H. MOFFAT, OF INDIANAPOLIS, INDIANA.

VEHICLE PARKING DEVICE.

Application filed November 12, 1927. Serial No. 232,306.

This invention relates to means for parking vehicles of which one feature is the provision of truck means adapted to be introduced beneath the rear wheels of an automobile for carrying same laterally, when rotating power is applied to the wheels of the truck means.

A further feature of the invention is the provision of means for utilizing the driving power of the propulsion motor of the vehicle for imparting rotating motion to the wheels of the truck means as desired.

A further feature of the invention is the provision of means for attaching the truck means to and carrying it by parts of the vehicle, means being provided for adjusting the truck to a position more adjacent to the bed of the vehicle, when not in use, so that the road clearance of the vehicle is not lessened by the installation of the invention thereon.

A further feature of the invention is the provision of levers so arranged that the wheeled truck will be automatically locked in or out of operative position.

A further object of the invention is to provide a truck means of this class in dual arrangement with a means for rigidly connecting the wheeled truck units together and in spaced relation, whereby they may be moved in exact unison and always remain in alignment with the wheels of the vehicle.

Other objects and advantages will be hereinafter more fully set forth and pointed out in the accompanying specification.

In the accompanying drawing which is made a part of this application:

Figure 1 is a fragmentary detail side elevation of a portion of an automobile showing the device in operative position by full lines; and in inoperative position by dotted lines, a part of the figure being shown in section.

Figure 2 is a fragmentary rear elevation thereof, shown partly in section.

Figure 3 is a fragmentary plan view of the two truck mechanisms and connecting means, partly in section.

Figure 4 is a detail sectional view as seen from lines 4—4 of Fig. 3.

Referring to the drawings in which similar reference numerals designate corresponding parts in all the views, 1 indicates the body of the vehicle, which may be constructed in the usual or any preferred manner, having a supporting chassis 2, and rear driving wheels 3.

It has been found very difficult to park an automobile especially flat to the curb, and in crowded districts, owing to the end to end relation of the many automobiles which are thus parked, and the lack of space between the cars. Usually an automobile is thus parked in a space, not much, if any greater, than its length; hence rendering it very difficult, if not impossible to drive or back same into or out of position. To this end, therefore, this device renders it possible to park an automobile in a very limited space and in a manner that the time required for parking is reduced to a minimum.

The invention comprises a pair of channel-like runways 4, which are adapted to receive the rear driving wheels 3 of the automobile, there being one runway for each of said rear wheels. Said runways are open at their rear ends so that said wheels readily enter same. Each one of the runways is provided with a pair of supporting wheel means 5, one set of said means having a worm gear 6 connected co-axially therewith, with which co-operates a worm gear 7 for driving same. By this arrangement the power from the automobile engine may be applied to one set of said supporting wheel means for causing both the runways to travel laterally in either direction, as will be understood. One of the runways 4 has adjacent each of its ends one of the rollers 8, which supports the respective vehicle wheel when entered therein. One of said rollers is connected with and operates the worm 7, thus obtaining driving power from said vehicle wheel, by which arrangement driving power is imparted to the supporting wheel means 5 thru the worm gear 6 and 7. Said worm and worm gear are preferably encased in a housing 9, thus protecting the same from dirt and grit, and if desired, lubricant may be placed within the housing for properly lubricating the gears and preventing undue wear thereon.

Owing to the conventional and universal driving means for the wheels of the automobile, it is not necessary to provide rollers and driving mechanism for the other runway. The respective automobile wheel preferably rests upon bars 10 which extend transversely across said other runway, one of said bars being preferably arranged so that the tire of the wheel will rest on the apex thereof, while the other bar is so preferably positioned that one flat face thereof will receive said tire. These bars 10 thus serve to hold one of the automobile wheels 3 against rotation.

The supporting wheel means 5 are conveniently pivoted to the runways 4 thru pairs of ears 11, which project inwardly from the inner walls of said runways, thus disposing said wheel means out of the path of the automobile wheels 3. The pair of runways is secured rigidly together by means of a brace bar 12, in yoke or strut manner. Said bar extends from one runway to the other and holds them spaced at uniform distance apart so that the runways will always remain in alignment with the wheels of the vehicle and prevent lateral or independent movement of said runways when the vehicle wheels are entering or leaving same. Attached to and projecting forwardly from the brace bar 12, is a pair of supporting rods 13, the ends of said rods connecting with said brace bar and gradually curving upwardly and forwardly for a distance, and then extending forwardly in a substantially straight line which declines rearwardly. These rods pass over support brackets 14, suspended from the chassis 2, or other convenient part of the vehicle. Bearing rollers 15, are preferably provided in conjunction with said brackets, to receive said rods, and it will be seen that as said rods move forwardly or rearwardly over said rollers, they will be thereby cammed upwardly or downwardly, respectively, and the runways 4 will thus be gradually raised or lowered.

The forward ends of the rods 13, are pivoted to links 16, which are in turn pivoted to crank arms 17, said arms being in turn fixed to a shaft 18, which is rotatably mounted at a somewhat forward portion of the vehicle. The crank arms 17 are substantially in line with the rods 13 and links 16, when moved to their extremity in either direction, thereby forming a substantial toggle-like lock for holding these parts against casual swinging movement. The shaft 18 is rotated in opposite directions by means of lever 19, which extends upwardly thru the bottom of the automobile floor 20, and is pivoted intermediately to its length, to said floor, the lower end of said lever being connected to a crank arm 21 on the shaft 18, thru the medium of a connecting link 22.

To provide a more or less positive lock for the parts of the device when in operative and inoperative positions, a secondary crank arm 23 is attached to one end of the shaft 18, to the free end of which is attached one end of a coiled contraction spring 24, the opposite end of the spring being attached upwardly to a suitable portion of the vehicle body. As the crank arm 23 swings forwardly and rearwardly in an arc of substantially half the circle, the tension thereof will always exert an upward pull on the crank arm and normally hold the shaft 18 against rotation, in either of the extreme forward or rear position of same. This will insure that the runways will be held in position beneath the driving wheels, especially during reverse rotation thereof, and will hold the runways in elevated position beneath the automobile when not in use.

When the automobile is to be parked and the parking space is limited, it is driven at an angle into the space until the forward end thereof is a short distance from the rear end of the preceding car. The upper end of the lever 19 is then pressed forwardly, as indicated by full lines in Fig. 1, this action moving the runways 4 rearwardly. Due to the curvature of the rods 13, the runways will move downwardly to a position directly in front of the rear wheels 3. The power clutch of the automobile is then thrown in and the wheels 3 move forwardly until they rest on the rollers 8 and bars 10, and by keeping the automobile running, power will be imparted to the worm 7 and gear 6 and set up traction of the supporting wheel means 5 to which the gear 6 is connected, and swing the rear end of the automobile laterally until it is in line with the curbing and between the other parked vehicles.

If, when removing the automobile from parked position other vehicles are still parked adjacent, the gears of the automobile are reversed thus imparting reverse traction to the wheel means 5, and moving the rear end of the automobile laterally away from the curb until it is beyond the line of the rearwardly parked vehicles. During this operation, forward pressure may be maintained against the upper end of the lever 19, to cooperate with the spring 24, in keeping the runways properly under the wheels 3, but as soon as the rear end of the automobile is cleared of the parked cars, a rearward pull is given the lever 19 so that the wheels 3 will move rearwardly out of the runways. A continued rearward pull on the lever 19 will move the runways forwardly and deposit them in close proximity to the bottom of the body 1, as indicated by dotted lines in Fig. 1, and thus retain same in this position until such time as it is necessary to again repeat the parking operation.

By arranging and constructing the device in the manner shown, the parts may be quickly and easily positioned for parking or storing away for travelling. As all the parts are normally positioned beneath the automobile, no unsightly parts will protrude to detract from the pleasing outlines thereof.

A very important feature of the invention resides in the fact that in the entrance, departure and operation of the wheels 3 in the runways 4, said runways being united by the brace bar 12 are caused to move forwardly or rearwardly in exact unison, while without the aid of such bar this relation could not be maintained, due to the tendency of one of the wheels 3 to shift one of the runways ahead to an uneven position with the other.

The supporting rods 13, are integrally united with the runways 4, by which construction, it will be obvious that the tilting of said rods on the brackets 14, as fulcrums, will correspondingly lift and tilt said runways, simultaneously. It will also be obvious that the walls 25, of said runways serve as guides to retain the vehicle wheels from sliding off of same sideways.

It will be obvious that the bars 10, together, form a lodge for the respective vehicle wheel.

The reinforcing braces 26, serve to rigidly connect the runways 4, with the forward end of the rods 13, which adds to the stability of the mechanism as a whole.

While the description and drawing illustrate in a general way certain instrumentalities, which may be employed in carrying the invention into effect, it is evident that many modifications may be made in the various details, without departing from the scope of the appended claims, it being understood that the invention is not restricted to the particular example herein described.

I claim as my invention:

1. In a parking device for vehicles, a pair of runways adapted to receive the driving wheels of a vehicle; a pair of bars in one runway for receiving a vehicle driving wheel when entered therein, said bars holding said wheel against rotation; a pair of rollers in the other runway on which the driving wheel entered therein will rest; supporting wheels on said runways; a gear attached to the supporting axle of one set of the supporting wheels, a worm attached to one of said rollers and intermeshing with said gear, adapted to impart rotating movement to said set of supporting wheels when the vehicle wheel thereon is rotated, for causing said runways to move laterally in either direction, as desired; means for predetermining the position of said runways; and means for backing said runways in operative positions.

2. In a parking device for vehicles, a pair of spaced runways, a rigid bar connecting said runways, a pair of supporting rods fixed to said bar at points between the runways, a pair of supporting wheels for each runway, one wheel of each pair on each side of said bar, a pair of stationary bars on one of said runways for engaging and holding a vehicle wheel against rotation while resting thereon, a pair of rollers in the other runway adapted to be driven by the other wheel of the vehicle, a worm and gear mechanism between one of said rollers and one of the pair of supporting wheels for said runway, for driving said supporting wheels in either direction, and a housing mechanism for said worm and gear mechanism.

3. In a parking device for vehicles, a pair of spaced runways adapted to receive the rear wheels of a vehicle, a rigid bar connecting said runways, supporting wheels for said runways, arranged to travel laterally to the traction of the vehicle, a pair of supporting rods attached at one end to said rigid bar, links pivoted to the opposite ends of said rods, a shaft pivoted to the vehicle, crank arms fixed to said shaft and with their outer ends pivoted to said links, said supporting arms, links, and crank arms being substantially aligned with each other when moved to either extreme position, and means for resisting rotation of said shaft when the parts connected therewith are shifted to their extremities.

In testimony whereof, I have hereunto set my hand on this the 10th day of November, 1927, A. D.

JOHN H. MOFFAT.